US006552820B1

(12) United States Patent
Hill

(10) Patent No.: US 6,552,820 B1
(45) **Date of Patent: *Apr. 22, 2003**

(54) PARTIAL PRINTING OF A SUBSTRATE

(75) Inventor: George R. Hill, Cheshire (GB)

(73) Assignee: Contra Vision Limited, Stockport (GB)

(*) Notice: Subject to any disclaimer, the term of this patent is extended or adjusted under 35 U.S.C. 154(b) by 0 days.

This patent is subject to a terminal disclaimer.

(21) Appl. No.: 09/564,586

(22) Filed: May 5, 2000

Related U.S. Application Data

(62) Division of application No. 09/051,921, filed as application No. PCT/GB96/02600 on Oct. 24, 1996.

(30) Foreign Application Priority Data

Oct. 24, 1995 (GB) ............................................ 9521797

(51) Int. Cl.$^{7}$ ................................................ G06F 15/00
(52) U.S. Cl. ........................................ 358/1.8; 358/1.18
(58) Field of Search ........................... 358/1.1, 1.6, 1.9, 358/1.12, 1.15, 1.16, 1.17, 1.18; 428/187, 204, 195, 198

(56) References Cited

U.S. PATENT DOCUMENTS

| | | | |
|---|---|---|---|
| 1,928,758 A | 10/1933 | Mairson et al. | 101/211 |
| 4,321,778 A | 3/1982 | Whitehead | 52/204 |
| 4,673,609 A | 6/1987 | Hill | 428/187 |
| 4,925,705 A | 5/1990 | Hill | 427/259 |
| 5,679,435 A | 10/1997 | Andriash | 428/137 |
| 5,830,529 A | 11/1998 | Ross | 422/152 |
| 5,858,155 A | 1/1999 | Hill | 156/230 |

FOREIGN PATENT DOCUMENTS

| | | |
|---|---|---|
| FR | 2 221 920 | 10/1974 |
| JP | 53-33723 | 3/1978 |
| JP | 62 270377 A | 11/1987 |
| JP | 63 071385 A | 3/1988 |
| WO | PCT/US96/09888 | 12/1997 |

OTHER PUBLICATIONS

International Search Report dated Feb. 20, 1997 re PCT/GB96/02600.

*Primary Examiner*—Gabriel Garcia
(74) *Attorney, Agent, or Firm*—Pillsbury Winthrop LLP

(57) ABSTRACT

A partially printed substrate with a print pattern comprising a first color deposited on the substrate and a second color deposited on the first color, the second color being darker than the first color, whereby the first and second colors are perceived as a combined, substantially single color in the area defined by the first color.

11 Claims, 7 Drawing Sheets

PARTIAL PRINTING OF A SUBSTRATE

This is a division of application Ser. No. 09/051,921, filed Sep. 28, 1998, which is a 371 of PCT/GB96/02600, filed Oct. 24, 1996.

FIELD

This invention relates to the partial printing of a substrate with a plurality of layers, at least one layer being applied to the substrate with inexact registration in relation to another layer.

BACKGROUND

There are a number of visual and other functional benefits in printing only part of the surface area of a substrate. For example, it is common to partially print a substrate with one or more colours to reveal the substrate exposed to form part of the required design. Such methods may also be used in the printing of printed circuits, membrane switches and backlit display panels in which superimposed layers must be in exact registration or one layer must overlap another layer, for example to achieve an insulating layer over a conductive layer of ink.

White is the most common colour of substrate to be printed over part of its area and revealed in other parts, firstly because it is easiest to achieve the desired perceived colour of other colours if they are printed on white, especially if such colours are formed by transparent or translucent inks. Secondly, white forms a good contrast to many other colours and enables easily visible graphic designs. Thirdly, white commonly forms a significantly high percentage of many designs. Fourthly, the mass processing of white substrates provides economy and efficiency in production, by standardisation of the base-colour, if not the material specification. Fifthly, white forms the normal background to four colour process printing, in which four colours (black, cyan, magenta and yellow) are typically printed in "half tone" dot patterns onto a white background, the size of the dots of each colour being typically printed in varying size according to "colour separations" to be replicated or by digital printing techniques utilising Raster Image Processing (RIP). From above a minimum distance, the eye cannot resolve the individual coloured dots but the coloured dots merge to give a combined perceived colour at any position on the printed product.

Conventional printing processes all suffer inexact registration, owing to i) printing machine error or "tolerance" in delivering ink or other marking material, ii) the dimensional instability of a liquid ink or other marking material in liquid state on a substrate, iii) the dimensional instability of a substrate through temperature and humidity changes between printing "passes" (printing of individual layers), and iv) the error or "tolerance" in delivery of a substrate into the printing position.

For many products, this lack of registration, or lack of being able to print ink on a substrate exactly where intended, is not important. However, there are a number of products which can be adversely affected by such lack of registration, one example being unidirectional or other vision control products, such as those disclosed in British Patent No. 2165292, which includes methods of printing with substantially exact registration and methods of overcoming the limitations of registration error of conventional printing methods. Such products typically comprise the partial printing of a transparent substrate with a fine pattern in the form of dots or lines with surrounding or intermediate transparent areas or of a grid pattern surrounding transparent areas.

A cross-section taken through such partially printed substrates will be in the form of a continuous substrate material on which are superimposed alternate printed portions and unprinted portions. When the cross-sectional dimensions of the printed portions of such a printed product are small and it is desired to superimpose more than one layer on such printed portions, the registration error of conventional printing processes can severely prejudice the achievement of the desired visual or other performance criteria. The critical factor is the registration error or tolerance of the printing process compared to the cross-sectional dimensions of the printed portions.

In the case of conventional four colour process printing (sometimes referred to as four colour half-tone printing) or digital four colour process printing, the size of the individual dots of colour are very small in relation to the background substrate, which is typically white and made of paper, card or plastic materials. Substantial lack of registration in the printing of individual dots is normally acceptable as the individual dots of one colour are not perceived as individual dots, but are combined with differently coloured dots to provide the required overall impression. Lack of registration between the dots of various colours is only generally perceived as a lack of sharpness of design boundaries within the design, such as the edges of insignia seen against a background colour. The observer sees what is printed. Only if the observer knows that the desired degree of edge clarity is different to that observed, or if the lack of registration is such that colour "halos" are seen at colour boundaries, is the lack of registration recognisable.

However, if the requirement is to print a relatively fine pattern of background colour, such as white dots, then superimpose one or more other uniform colours or four colour process colours on some or all of these dots, the lack of registration of the printing process can have a significantly deleterious effect on the functional performance compared to that intended. For example, the perceived colours of an image or design will vary over the area of the substrate from the desired colours owing to the visual interaction of the unregistered layers. If a pattern of 1 mm sided square white dots are intended to be covered with 1 mm sided square dots of a different colour, but there is a registration error of 0.2 mm in two orthogonal directions on plan, as in FIG. 1 of the accompanying drawings, then 36% of the desired area will appear white and have a corresponding effect of 0.36 $mm^2$ white on the overall printed area of 1.36 $mm^2$. If the substrate is black and the different colour is formed by transparent ink, the different colour will be substantially invisible against the black substrate and the 0.36 $mm^2$ of white will be seen in combination with the 0.64 $mm^2$ area of the different colour, which will appear consequently "whitened" in this area. Such alteration from the desired perceived colour will be most noticeable compared to other individual squares making up the pattern where the error in registration differs and compared to any squares in which the different colour substantially covers the white. If the different colour was intended to appear uniform over an area of panel, it will instead appear to be shaded.

If the substrate is transparent, such lack of registration will be typically visible from the other side of the substrate as well, the overlapping different colour in the above example being visible as well as the white square. There is another problem that undesirable perception of colour can be caused by lack of opacity of individual ink layers. In the above example, if the white and different colour were printed on a transparent substrate, when the white is observed from the other side of the substrate, this could be modified by the different colour, which could be exacerbated by the illumination condition behind the substrate.

From the printed side of the panel, the different colour covering the white area would be perceived as being a whitened or a lighter colour tone of the different colour. It is common in printing to overcome such lack of opacity by printing more than one layer of a colour, to achieve the desired or necessary degree of opacity. However, if the registration error is relatively large compared to the cross-sectional dimensions of the printed portions being printed, the lack of registration will result in yet further areas of different perceived colour where the edges of the desired shape overlap through lack of registration.

SUMMARY

The purpose of this invention is to overcome the above-mentioned problems in the partial printing of a substrate with printed portions of relatively small cross-sectional dimensions, typically less than 1 centimeter width, and commonly less than 1 millimeter width, in which the registration error between at least two printed layers intended to be partially or totally superimposed would otherwise affect the desired product's functional performance, such as the perceived image of the printed product.

According to the invention there is provided a panel comprising a substantially imperforate substrate (as defined herein) with a print pattern (as defined herein) adhered to said substrate, and wherein said print pattern comprises a first layer and a second layer (as defined herein) and wherein a particular cross-section taken through said panel comprises said substrate having two outer edges and said print pattern having alternate printed portions and unprinted portions, and wherein every printed portion has two outer edges, and wherein within said particular cross-section said second layer has two outer boundaries, and each of said printed portions between said two outer boundaries are constructed and arranged such that they include a part of said first layer and a part of said second layer and they include two outer edges of said part of said first layer and two outer edges of said part of said second layer, and wherein said two outer edges of said part of said second layer are within said two outer edges of said part of said first layer, and wherein the average cross-sectional printed portion width (as defined herein) is less than one centimeter, and said panel is made by a method comprising: printing said second layer within said each of said printed portions between said two outer boundaries of said second layer by applying at least a part of a presented width (as defined herein) of said second layer within said each of said printed portions and said presented width of said second layer only adheres within said each of said printed portions, and within at least one of said printed portions having both said two outer edges within and spaced from said two outer edges of said substrate, said presented width of said part of said second layer differs from the width of said at least one of said printed portions by at least 10% of the width of said part of said second layer.

The invention also provides a panel comprising a substantially imperforate substrate (as defined herein) with a print pattern (as defined herein) adhered to said substrate, and wherein said print pattern comprises a first layer and a second layer (as defined herein) and wherein a particular cross-section taken through said panel comprises said substrate having two outer edges and said print pattern having alternate printed portions and unprinted portions, and wherein every printed portion has two outer edges, and wherein within said particular cross-section said second layer has two outer boundaries, and each of said printed portions between said two outer boundaries are constructed and arranged such that they include a part of said first layer and a part of said second layer and they include two outer edges of said part of said first layer and two outer edges of said part of said second layer, and wherein said two outer edges of said part of said second layer are within said two outer edges of said part of said first layer, and wherein the average cross-sectional printed portion width (as defined herein) is less than one centimeter, and within at least one of said printed portions having both said two outer edges within and spaced from said two outer edges of said substrate, the width between said two outer edges of said part of said second layer differs from the width of said at least one of said printed portions by at least 10% of the width of said part of said second layer.

A "substrate" may be a single sheet of homogeneous material or a multi-layer material or assembly, for example incorporating the overall application of a printed ink layer. Typically, the substrate is substantially imperforate, except for any holes that may be used to assist printing registration or to feed the substrate through a printing or other machine.

In all embodiments of the invention, only part of the substrate is printed, termed the "print pattern". The "print pattern" is typically a pattern of dots, lines or other plurality of discrete elements and/or a grid pattern surrounding a plurality of unprinted areas.

In all embodiments it is possible to take a particular cross-section through a panel of the invention comprising the substrate having two outer edges and the print pattern having alternate printed portions and unprinted portions, each printed portion having two outer edges. At least one and typically all the printed portions comprise a first layer of one material, for example a printed ink. A second layer of printed material typically overlies or underlies the first layer within every printed portion within the boundaries of the second layer.

The term "second layer" means a layer of a single material, such as a single colour ink, or a four colour printing process layer, in which the individual colour deposits, normally black, cyan, magenta and yellow, are typically discontinuous within a printed portion. Within a particular cross-section, the second layer has two outer boundaries and within the two outer boundaries each printed portion is constructed to have the two outer edges of a part of the second layer lying within the two outer edges of a part of the first layer, which includes the possibilities of one outer edge of the second layer being coterminuous with an outer edge of the second layer or the outer edges of both layers being coterminous.

The width of a printed portion or the part of a layer within a printed portion is the dimension between its two outer edges. In a particular cross-section through a panel, the "average cross-sectional printed portion width" is the sum of the widths of every printed portion within the particular cross-section divided by the total number of printed portions within the particular cross-section.

A "presented width of the second layer" is the width of the second layer presented over a single printed portion in a printing process. It may be the actual width of printed second layer material deposited or a larger width. For example, a presented width of the second layer may include portions which are presented to the substrate outside the outer edges of a printed portion but which are not adhered to the substrate outside the outer edges of the printed portion. If a second layer is presented continuously over printed and unprinted portions, the presented width of the second layer for a single printed portion is deemed to be the width between the mid-points of the two adjacent unprinted portions.

The difference between the presented width of the second layer and the width of the printed portion to which it is presented represents the registration tolerance the invention enables while producing the desired product. The term "presented" includes the physical application of a layer of printing ink, foil, toner or transfer material to the substrate or a previously applied layer, or such materials may be presented in a spaced relationship from the substrate, for example to be attracted by electrostatic charge within the printed portions of the substrate or of a previously applied layer.

The invention provides for the management or elimination of registration error in a printed product, registration error that would otherwise cause deficiencies in the printed product. Whilst it is possible to reduce the problems of registration error by pre-printing a design on a transfer medium and selectively transferring this to the required print portions, the invention enables the control of direct printing of a substrate. "Direct printing" in this context means the application of individual colours, such as a single 'spot' colour, to be perceived as the single colour in a design, or the individual black, cyan, magenta or yellow colours of a four colour printing process, delivered from their individual sources, such as ink or toner reservoirs or a thermal transfer foil cartridge, rather than a pre-printed four colour process design on a transfer medium.

In one embodiment of the invention within some or all printed portions, a second layer extends beyond the perimeter of a first layer. Typically, a transparent or translucent second layer completely covers and extends beyond the perimeter of a white first layer. A dark background is provided under the first colour layer by means of a dark substrate or a dark colour third layer deposited on the substrate within one or more printed portions. For example, the print pattern is printed on a substrate in black and then a white first layer is printed within and spaced inside the black layer. The discrete or interconnected white areas are overprinted with the desired design colour or colours using transparent or translucent ink, which overlaps the white but stays within the black areas. The combination of the printed second colour layer and the printed white first layer produces the desired perceived colour. This result is achieved because, on each printed portion, the transparent or translucent design colour ink is not readily visible against the black background but combines with the white first layer to produce the desired perceived colour. This embodiment is referred to as the "Through Combination".

In order to ensure that the transparent or translucent second colour layer extends beyond the white first layer but lies within the third black layer, on each printed portion, the black layer width should be wider than the white layer width by an amount of at least eight times the printing tolerance (8T) and the second colour layer should typically be wider than the white layer by an amount of four times the printing tolerance (4T). Typically, the nominal edge gap between the black and second colour layers should be two times the printing tolerance (2T) and the nominal edge gap between the second colour layer and the white layer should also be two times the printing tolerance (2T). The printing tolerance T is the maximum registration error that should result using a particular printing process, substrate and ink. Such an arrangement enables any edge of the transparent or translucent second colour layer to stay within the exposed area of the black layer, whatever the direction and amount of actual error in any of the three layers within any printed portion.

In another embodiment, referred to herein as the "Lateral Combination" the second layer is deposited within the area defined by the first layer and has a smaller area than that of the first colour layer. Typically, on each printed portion, a second colour layer is printed within a white first layer. The printed portions are sufficiently small and the relative sizes of the exposed areas of the first and second colours are such that the eye and brain combine the two colours together to give the desired perceived colour.

For example, in order to print panels of the type described in GB 2165292, a print pattern can be printed in white and design colour ink or inks are printed to fall wholly within the white print pattern. The design colour ink is selected such that the exposed white and design colours combine to provide the required perceived design colour or colours, the design colours being printed darker than the intended perceived colour, to compensate for the whitening effect of the area of white, resulting in a perceived colour of a lighter "grey tone". The area of white to be exposed would normally be minimised and depend on the shape of the dot, line or grid pattern and the tolerance in registration which can confidently be achieved by the selected printing method, equipment and inks. The less the error in registration that can be reliably achieved, the larger the area of colour that can be printed to reliably fall within the area of white. Typically, the cross-sectional width of the design colour layer within a printed portion would be less than the white first layer width by an amount of at least four times the printing tolerance (4T) with a nominal edge gap of two times the printing tolerance (2T) between the edges of the design colour layer and the white background colour layer. Such an arrangement enables the white background colour layer to shift out of registration by the given tolerance in one direction and a second design colour layer to shift by the given tolerance in the opposite direction without overlapping the background colour layer.

In another embodiment of the invention, the second layer is presented to the substrate over an area extending beyond the first layer of one or more printed portions but only adheres to the first layer within the printed portions and does not adhere at all to the substrate between the printed portions. Typically, the second layer is a second design colour layer and is presented over the whole surface of the substrate within the desired outer boundaries of the second design colour layer. It is intended to be seen against a white layer, which may be the first layer or the white layer may be a third layer within a first black layer. The second design colour layer adheres to the first layer but is typically immediately removed from the unprinted portions in the same operation. If the second design colour layer is opaque, then its colour is perceived independently over the first colour layer to which it is applied. If the second design colour layer is transparent or translucent, it is perceived as a Through Combination, typically with a white layer.

Within any printed portion, the second layer is substantially exactly registered over the first layer. Means of achieving exactly or substantially exactly registered superimposed layers are disclosed in GB 2118096, 2165292 and GB 2188873. However, the present invention distinguishes from those methods in ways that are advantageous, by enabling the use of existing printing methods and eliminating additional steps to achieve substantially exact registration, such as the removal of cured marking material. This embodiment is referred to as the "Improved Exact Registration".

In another embodiment, the invention may be used to print a pattern of dots, lines or a grid pattern on a transparent substrate to manufacture a product of similar performance characteristics to those in British Patent No. 2165292. In such products, there is a "silhouette pattern" of opaque material "which subdivides a panel into a plurality of opaque areas and/or transparent or translucent areas". Within the silhouette pattern, there is typically a number of superimposed ink layers to provide a design that is visible from one side of the panel which is not visible from the other side of the panel. British Patent No. 2165292 describes a number of methods of production which can achieve this effect, some providing exact or substantially exact registration of superimposed ink layers. In one method described as the Overlap Method and illustrated in FIG. 18 of Pat. No. 2165292 one layer of ink overlaps a design colour ink layer and thus obscures it from the other side of the panel.

The present invention provides an improvement to that method enabling the desired design colour rendering to be achieved in spite of the registration limitations of conventional printing processes. In a typical panel, a silhouette pattern of black ink is superimposed by a background colour layer, typically white ink of lesser cross-sectional dimension than the black ink, in order for the white ink not to be visible from the other side of the black ink and, therefore, the other side of the panel. One or more design colour layers are then superimposed over the white layer, in order to provide the desired design, typically ensuring that the design colour layers do not overlap the black background layer, so as not to be visible from the other side of the panel.

By means of the present invention, using the Through Combination embodiment, transparent or translucent design colour inks are arranged to extend beyond and completely cover the white background layer. Those parts of the transparent or translucent colour which extend beyond the white background layer are not readily visible against the black background layer. Alternatively, according to the Lateral Combination embodiment, the design colour inks should be arranged to be applied only within the white background colour layer in order to achieve the required perceived design colour or colours.

In another alternative, according to the Improved Exact Registration embodiment, the design colour inks are presented beyond a first layer of white or beyond a layer of black within which there is a layer of white, providing the desired colour perception over the area of white.

In the Through Combination or Improved Exact Registration embodiments, the desired colour or colours are seen in combination with an underlying white layer. With the Lateral Combination embodiment, the selection of a second layer design colour to achieve the required final effect depends upon the type of ink and the respective perceived colours of the cured second layer design colour ink and the background white ink and their respective proportions. The subject of colour theory is complex including the means of predicting the effects of colour mixing and the perception of coloured areas. Colour properties of hue, luminosity, saturation, intensity, tonality and purity are affected and may be modified by underlying and surrounding or adjacent colours. Whilst it is relatively easy to predict and control the effects of achromatic colours (white, black and greys) on other colours, no simple formula can be provided. The properties of particular white pigments and ink formulations vary and the prediction of a change in grey tone should ideally be undertaken using analytical equipment such as a spectrophotometer to analyse the individual white and second layer colours, in order to predict the perceived colour of the combination. The grey tone is a term of art used in colour systems to describe perceived lightness or darkness of a particular colour, which may vary from virtually white (near zero % grey tone) to virtually black (near 100% grey tone), across a chromatic chiaroscural scale.

The scale of grey tones from white to black is a continuous gradation. It is known that the trained eye can distinguish at least two hundred grey tones across an achromatic chiaroscural scale. Common colour matching systems identify relatively crude grey tone gradations. For example, the Pantone Matching Systems® identifies greys expressed as a percentage of black in a black and white mixture of 1.5%, 3%, 6.2%, 12.5%, 25% and 50%. The difference between the greys with 1.5% black and 3% black is clearly visible to any sighted person. Typical registration error in normal printing methods can easily cause variations of grey tone, from a desired value, of 10%, 20%, 30% and more in the partial printing of a substrate. For most printing methods a plus or minus registration tolerance of 0.1 mm is regarded as extremely good. However, the printing of a pattern of 1 mm wide lines of a colour layer over a white layer on a black background could cause a width of 0.8 mm colour with a 0.2 mm white overlap with a registration error of 0.1 mm in each layer, in opposite directions. In this example, a layer of design colour ink that covers 80% of the background white colour ink might be whitened or lightened in grey tone by say 25%. With the Lateral Combination embodiment, a difference of 10% between the presented width of a second layer and the width of a printed portion allows for a tolerance (T) of plus or minus 0.1 mm for a 4 mm printed portion width (4T=0.4 mm=10% of 4 mm). A 20% difference allows a tolerance of plus or minus 0.1 mm for a 2 mm printed portion width, etc. Such registration errors without the features of this invention would typically incur clearly visible undesirable variation in the grey tone of a colour within its outer boundaries. The features of this invention substantially eliminate variation from a desired perceived colour owing to registration error.

The invention allows for a plurality of layers of any colour to be applied within the stated dimensional tolerances, to achieve a satisfactory product. For example, using litho printing, which typically uses transparent inks, it may be necessary to apply 4 to 6 layers of black to achieve an opaque black layer. Similarly, it may be necessary to print between 4 and 10 layers of ink in order to achieve a white colour of sufficient opacity to form the base for transparent design colours. The layers may be required to all be white or one or more of the layers may be silver, a common method of attempting to achieve a white opaque effect. Also well known, a percentage of blue ink may be mixed with the white ink in one or more of the layers, which provides the optical illusion of increasing the whiteness of brightness of the white. According to the dimensional disciplines of the invention, none of the white layers will overlap any of the black layers. For the Through Combination embodiment, all of the design colour layers will overlap and cover the whole of every white colour layer that is not intended to be seen in the finished product. In the Lateral Combination embodiment, every design colour layer would fall within a white background colour layer. For such multiple layer colour deposits, the actual printing registration error will vary from printing pass to printing pass. If such error was random, this would follow a "normal distribution curve" of displacement from the desired nominal position on the substrate or from a previous colour deposit.

In most methods of printing, a reliably achievable printing tolerance is not the same in every direction, typically relating to the direction of "pull" of a squeegee blade in screen printing or the direction of substrate travel in printing systems involving a rotating cylinder, such as offset litho printing. The registration error and, therefore, tolerance to be adopted is generally greater in the direction of movement in the application of ink than perpendicular to this. A refinement of the invention, therefore, would allow for a lesser tolerance (TL) in one direction, typically being the direction of ink application and a greater tolerance (TG) in the direction perpendicular to the one direction. The cross-sectional dimensions of the individual layers would then be determined by using either TL or TG or a combined tolerance at any intermediate angle, which may be calculated vectorially. In certain printing methods, the tolerance also varies according to other factors, for example in screen printing the tolerance is typically different at the outside ends of a squeegee than the centre, owing to the geometrical distortion of the screen when squeegee pressure is applied, depending principally upon the gap between the end of the squeegee and the screen printing frame, the "snap-off" gap between the screen and the substrate, and the type and tension of the screen mesh.

It is also well known that with litho printing, in which one edge of a substrate is gripped by "grippers", that the lateral tolerance parallel to the grippers or leading edge of the substrate increases with the distance from the leading edge, such that if a pattern of parallel lines is printed perpendicular to the leading edge, these lines tend to "fan out" from the leading edge. However, it is the relative tolerance of different applications of ink that is generally more important in relation to the invention than the absolute tolerance in relation to the substrate. The tolerance requirements to practise the invention can easily be established from printing manufacturers' guidelines and/or experimentation. Ultimately, the achievement of the desired performance characteristics will prove the tolerances required in the design and production of artwork, screen printing screens, offset litho plates, etc.

In order to minimise the effect of printing tolerances in the manufacture of such products, it is generally preferable to have a print pattern of lines oriented in the direction of movement of the application of ink, for example perpendicular to the squeegee in screen printing or the "gripper" leading edge in offset litho printing.

Panels of the invention according to the Through Combination and Lateral Combination embodiments can be manufactured by virtually any printing process, including traditional processes such as screenprinting, offset litho printing and gravure printing. They may also utilise any of the digital printing methods, including those grouped under the categories of Electrographic, Thermal Transfer and Ink Jet printing.

All these digital methods typically use a Raster Image Processor for enabling the positioning and size of deposits of black, cyan, magenta and yellow material in a four colour process and/or additional 'spot' colours.

Panels of the invention according to the Improved Exact Registration embodiment utilise methods of printing that enable the second layer to adhere within the printed portions but not adhere within the unprinted portions, to which the ink, foil, toner or other marking material is presented but not adhered. Such methods include 1. Thermal Transfer Differential Adhesion Method. This method uses conventional thermal foil transfer equipment, such as the Gerber Edge®, a registered trade mark of Gerber Scientific Products, Inc., USA. Such machines typically utilise a cartridge of foil comprising a polyester support and a pigmented resin layer, which is passed through a transfer head comprising thousands of mini heat presses, which are activated by computer control utilising a Raster Image Processor, to melt and bond deposits of the pigmented resin layer to a pvc substrate, four passes being required using black, cyan, magenta and yellow foils to build up a four colour process image. 'Spot' colours, including metallic foils, are also commonly used. This Improved Exact Registration method requires the print pattern to be determined using a material that is receptive to such thermal transfer on a substrate that is not very receptive to thermal transfer. In one example, a print pattern is applied in one or more layers of pvc ink of relatively high plasticity, such as a typical pvc ink used for vehicle livery, preferably a gloss ink to provide a relatively smooth macro surface topography, preferably white. Alternatively, a clear highly plasticised pvc lacquer or other material with a relatively smooth and high energy surface can overly a white layer. This print pattern is applied to conventional print treated polyester film. When processed in a thermal transfer machine as for pvc substrate, the pigmented resin layer adheres to the print pattern but not to the substrate. Alternatively, a conventional pvc substrate can be treated to have relatively low surface energy outside the print pattern, for example by applying a silicone based material outside the area of the print pattern. Transfer would then take place within the exposed area of pvc substrate but not the pretreated area.
2. Electrographic Differential Adhesion Method. Electrographic processes such as Scotchprint™, a trade mark of the Minnesota Mining and Manufacturing Company, USA, typically involve the electrographic printing of an image on a transfer medium such as "Wearcoat" transfer medium manufactured by REXAM, Inc., USA. This transfer medium is then passed through rollers with a substrate, such as pvc film, under heat and pressure, which transfers the image from the carrier.

Using similar substrate and ink materials as outlined in Method 1, it is possible to selectively transfer the preprinted image to a print pattern but not to the substrate.

3. Ink Jet Differential Adhesion Method. This method requires an ink receptive print pattern and an ink repellent substrate. Ink jet inks are conventionally water based and will not adhere to conventional pvc, polyester or other such substrates without pretreatment. Substrates such as polyester or polyester treated to receive pvc inks are hydrophobic, rejecting normal water based materials. Inks suited to printing paper or card are typically hydrophilic, receptive to water based inks which adhere and dry on them. One such ink is Hydroprint 2200 Series manufactured by Coates Lorilleux Screen Ltd.

A print pattern is printed incorporating a top layer of white hydrophilic ink. This enables an ink jet printer to emit ink for an overall four colour image but the ink only adheres to the print pattern. The 'free' ink on the areas to be unprinted, which does not adhere, can be absorbed into an underlying hydrophilic layer, typically a layer of black ink lying outside the white ink, to avoid contamination of the white layer by absorbed second layer design colour ink. Alternatively, any remnants of ink outside the print pattern can be removed by an air knife, cleaning roller, be wiped off, be washed off or removed by other means.

4. Electrostatic Chargeable Print Pattern Method. A substrate is printed with a print pattern that includes a layer of chargeable material, that is charged with an electrostatic latent image, onto which electrostatically charged toner is attracted but is not attracted to the surrounding substrate.

The electrostatic latent image is charged by an electronic writing stylus immediately before being fed through a toner fountain of conventional liquid toner which is either heat fusible or air dried after being attracted to the print pattern, or powder toner, which is fused by heat and/or pressure after being attracted to the print pattern.

The print pattern comprises a chargeable first layer, such as a paper based material or an insulating ink, common in the printing of printed circuits, keyboards, membrane switches, etc. Alternatively, the coating material used on electrostatically printed pvc film can be selectively coated to a pvc film, typically by screenprinting a pattern of lines.

Whilst it is possible to selectively charge a conventional substrate for electrostatic printing by means of suitable software, toner inks are typically transparent or translucent and it is advantageous for many products to have an opaque print pattern onto which the toner will be attracted, such as a white on black print pattern incorporating the chargeable layer.

5. Print Pattern Trip Method. Digital Printing Machines, and those for Thermal Transfer and Ink Jet printing in particular, can be instructed to print on selected areas of the substrate forming the print pattern. As an example, a print pattern of lines of one or more layers can be printed on a transparent substrate by any method, ideally with opaque ink, typically having a white top layer or white layer overlain by a clear layer which is receptive to the particular marking material, such as foil transfer pigmented resin or ink jet inks.

The substrate is fed in the direction perpendicular to the print pattern lines and optical scanning devices, such as those used in printing machine registration devices, 'trip' where identifying the leading and trailing edges of the lines and instruct the ink jets or other marking material delivery device to deliver onto the opaque areas but not the transparent areas.

In any of the previously described methods, where an opaque white layer and/or an opaque black layer is required, onto which to superimpose design colours, it may be preferable to print such opaque background layers by screenprinting or other means of applying relatively thick layers of relatively opaque ink. These opaque layers can then be superimposed by transparent or translucent inks using another technique, such as a digital printing technique.

BRIEF DESCRIPTION OF THE DRAWINGS

Specific embodiments of the invention will now be described by way of example with reference to the accompanying drawings in which.

DETAILED DESCRIPTION

Figure 1:
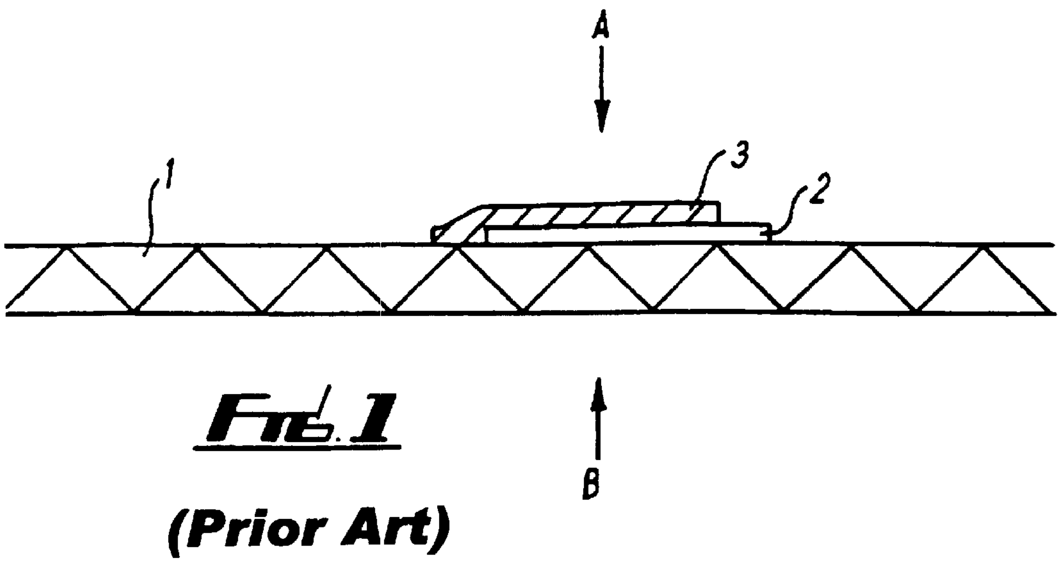
FIG. 1 (Prior Art)
FIG. 1 is a section through a prior art partially printed substrate.
Figure 1A:
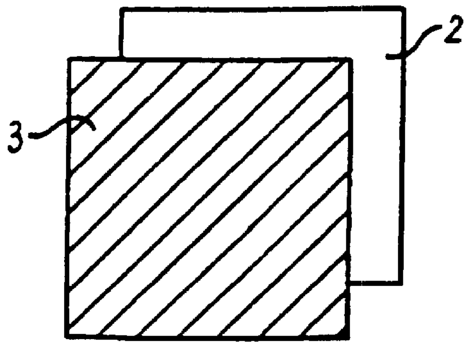
FIG. 1A (Prior Art)
FIG. 1A is a plan view of the printed substrate of FIG. 1 in the direction of arrow A.
Figure 1B:
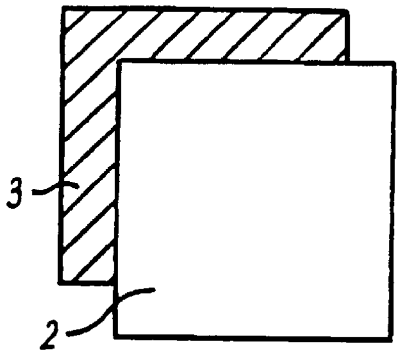
FIG. 1B (Prior Art)
FIG. 1B is an under plan view of the substrate of FIG. 1 in the direction of arrow B.

Referring to FIGS. 1, 1A and 1B, a substrate 1 is printed with a white colour 2. A second darker colour 3 is intended to be deposited over the same area is colour 2. However, as illustrated in the drawings the lack of exact registration means that in plan view part of the white colour 2 extends beyond part of the perimeter of the dark colour 3. The net effect of this lack of registration is that where the dark colour overlies the white colour, the dark colour will appear diluted in hue compared to the part of the dark colour that does not overlie the white colour. The problem is that in other parts of the print pattern the extent of lack of registration will inevitably be different so that overall there will be a distinct lack of uniformity in the appearance of the print pattern.

Figure 2:
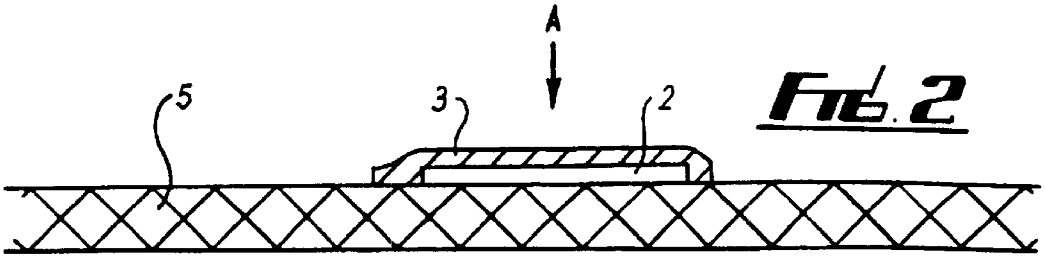
FIG. 2 is a section through a Through Combination embodiment of the invention.
Figure 2A:
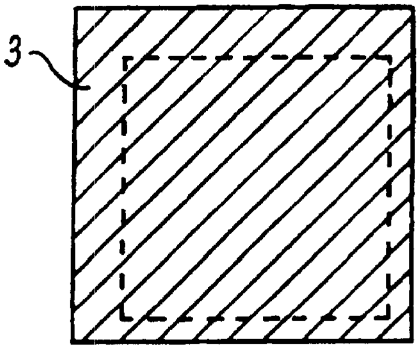
FIG. 2A is a plan view of the embodiment of FIG. 2 in the direction of arrow A.

Referring now to FIG. 2 a dark, preferably black, opaque substrate 5, has a white colour 2 deposited thereon. The white colour is covered completely by a transparent or translucent colour 3, such that layer 3 extends beyond the edge of the white colour 2. When viewed in the direction of arrow A the eye perceives a combination of the white and colour layers 2 and 3 over the area of the white colour. The parts of colour 3 which extend beyond the white colour, being transparent appear to be substantially the colour of the substrate, i.e. black. It will be seen that the combination of the white and colour layers 2 and 3 will be the same over the entire print pattern irrespective of variations in registration of the colour 3 relative to the white layer 2.

Figure 3:
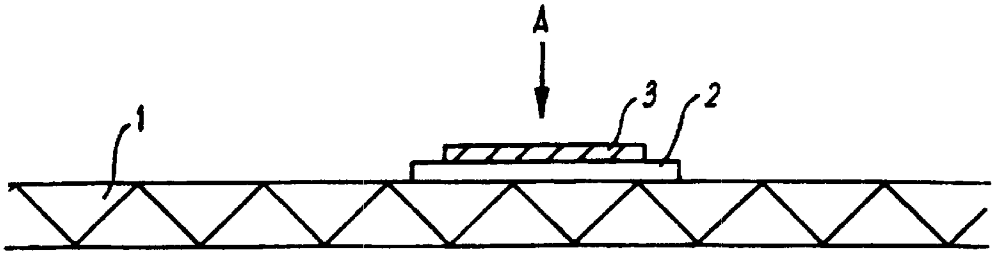
FIG. 3 is a section through a Lateral Combination embodiment of the invention.
Figure 3A:
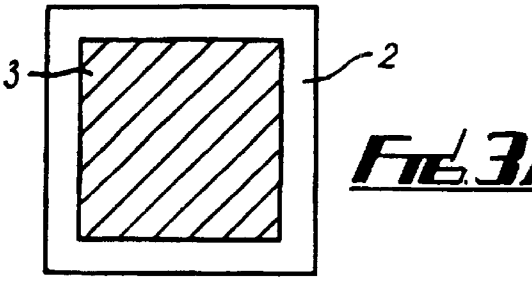
FIG. 3A is a plan view of the embodiment of FIG. 3 in the direction of arrow A.

In the embodiment of FIG. 3 a combination of colours is achieved by virtue of colour layer 3 being of smaller area than white layer 2 and being deposited completely within white layer 2. Variations in the position of layer 3 on layer 2 do not affect the relative areas of white and colour that are exposed with the result that the overall appearance of the print pattern will be uniform.

Figure 4:
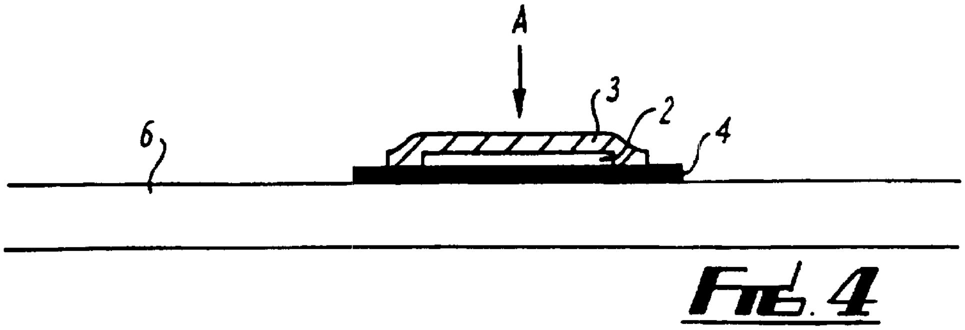
FIG. 4 is a section through another embodiment of the Through Combination type.
Figure 4A:
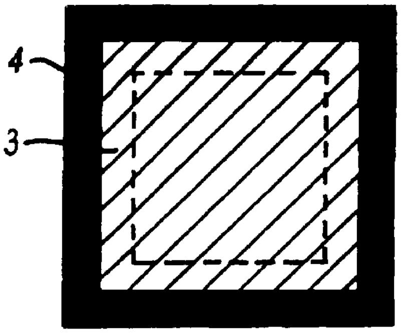
FIG. 4A is a plan view of the embodiment of FIG. 4 in the direction of arrow A.

The embodiment of FIG. 4 is similar to that of FIG. 2 except that the substrate 6 is transparent and a black or dark layer 4 is deposited under the white colour 2. To obtain the desired effect the area of layer 4 should be big enough always to extend to the limit of any possible position of the colour layer 3.

Figure 5:
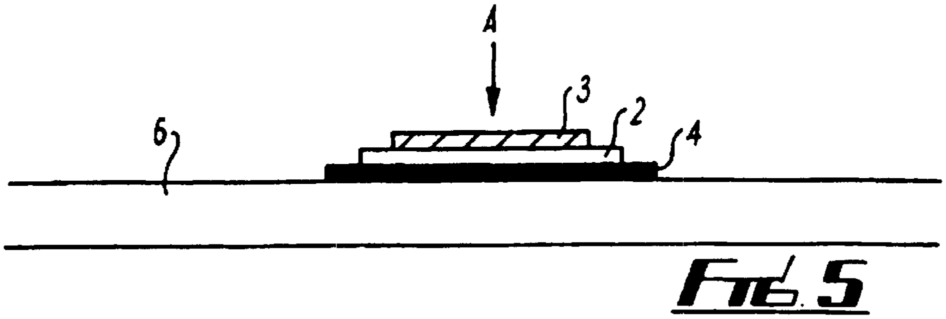
FIG. 5 is a section through another embodiment of the Lateral Combination type.
Figure 5A:
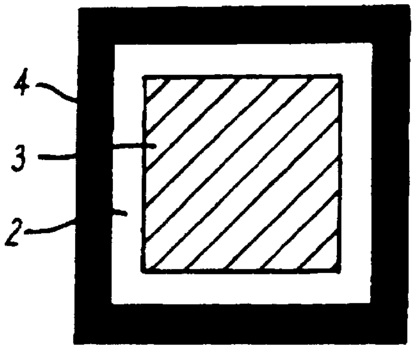
FIG. 5A is a plan view of the embodiment of FIG. 5 in the direction of arrow A.

FIG. 5 shows an embodiment which is similar to that of FIG. 3, but with a transparent substrate 6 and a black or dark layer 4 under the white colour 2. The layer 4 should project beyond the perimeter of the white colour 2.

Figure 6:
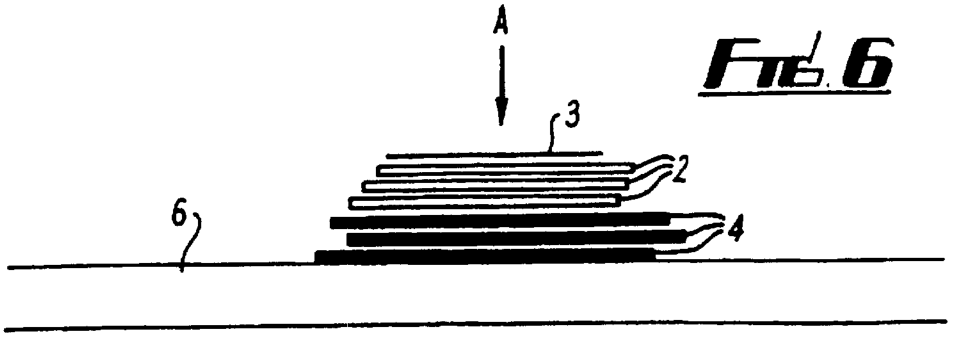
FIG. 6 is a section through yet another embodiment of the Lateral Combination type.
Figure 6A:
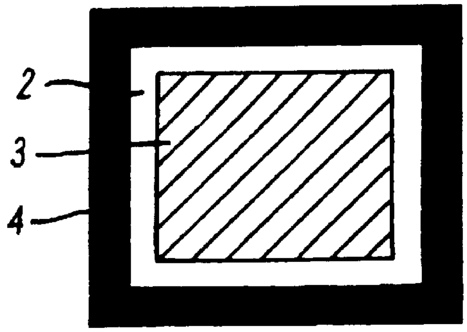
FIG. 6A is a plan view of the embodiment of FIG. 6 in the direction of arrow A.

FIG. 6 illustrates the use of a plurality of layers to achieve a lateral combination embodiment similar to that of FIG. 5. As can be seen in the drawing three black layers 4 are deposited on substrate 6, but with inexact registration. Three white layers 2 are deposited on the black layers and then one colour layer 3 is deposited onto the white layers 2 with inexact registration. Although there may be some perceived blurring at the edges of the layers the overall effect across the print pattern will be substantially uniform.

Figure 7:
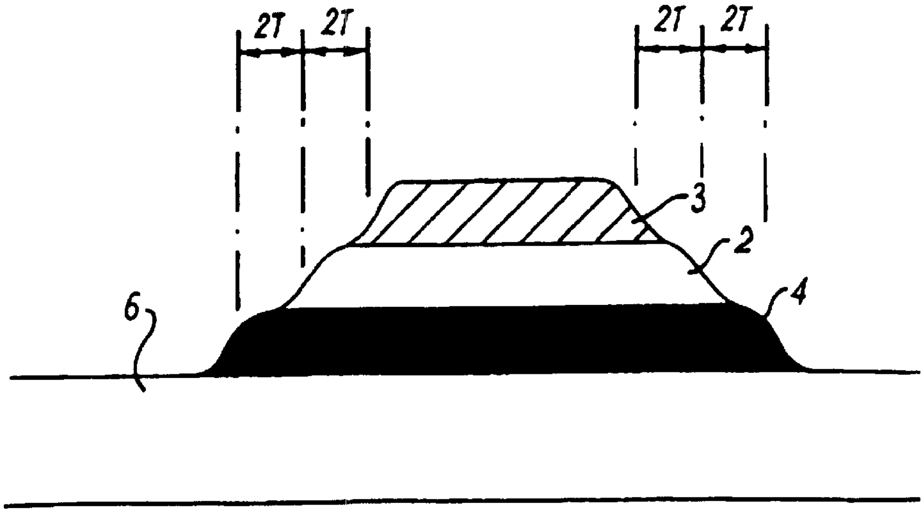
FIG. 7 is a section through an embodiment similar to that of FIG. 6.

FIG. 7 illustrates a section through multiple ink layers which follow a theoretical "normal distribution" of ink layers within the achievable tolerance zones. The aggregate thickness of the multiple ink layers within a zone will vary at the outside of each layer to reflect the variation in the boundary position of each layer according to a normal distribution curve across a tolerance width referenced 2T. FIG. 7 illustrates a design colour as a multiple layer deposit, but even if multiple layers are required to achieve the desired opacity of a black multilayer deposit 4 and a white multilayer deposit 2, design colour layer 3 could be a single layer in most practical embodiments of the invention.

It should be understood that in FIGS. 1 to 7 the design colour 3 could be a four colour process layer within the same dimension of tolerance discipline as if it were a uniform colour layer, the four colour ink deposits extending beyond the boundaries of the white layer 2 for the through combination embodiments, but maintained within the white layer 2 for the lateral combination embodiments.

Figure 8A:
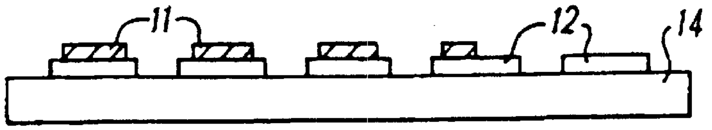
FIGS. 8A through to 8D are sections through a printed substrate illustrating Lateral Combination embodiments.

FIGS. 8A through to 8D illustrate Lateral Combination embodiments of partial printing.

Five print portions are illustrated which shall be referred to as 1–5 numbering from the left hand side.

FIG. 8A illustrates a panel of the invention in which second colour layer 11 lies within first white layer 12 printed onto substrate 14 within the left hand outer boundary first print portion to the right hand outer boundary on the fourth print portion.

Figure 8B:
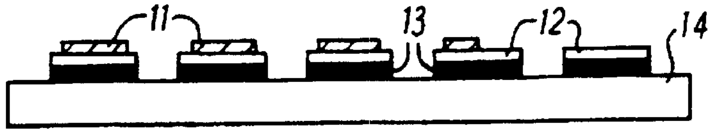

FIG. 8B is similar to 8A except that design colour layer 11 falls within two exactly superimposed layers, white layer 12 and black layer 13.

Figure 8C:
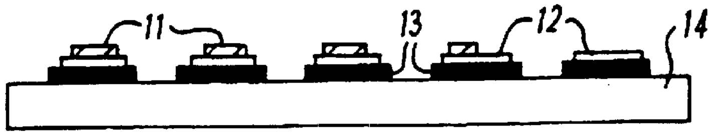

In FIG. 8C, second colour layer 11 lies within white layer 12, which in turn lies within black layer 13.

Figure 8D:
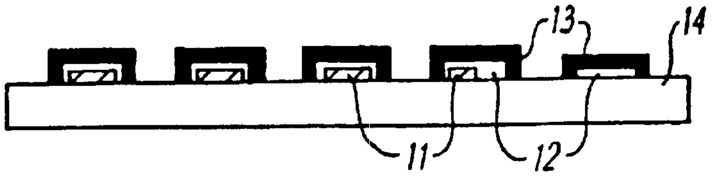

The order of printing the layers may be reversed. For example, in FIG. 8D, the second layer 11 is first printed onto substrate 14, then the white layer and then the black layer 13.

Figure 9A:
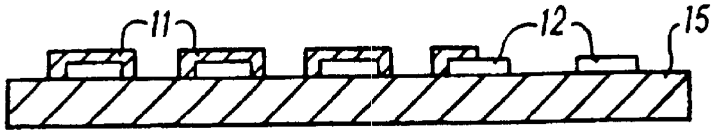
FIGS. 9A through to 9C are sections through a printed substrate illustrating Through Combination embodiments.
Figure 9B:
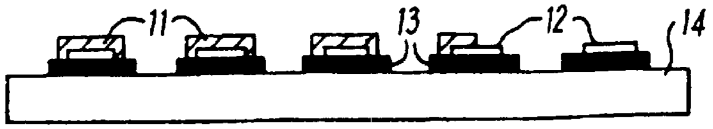

FIGS. 9A and 9B illustrate Through Combination embodiments of the invention.

In FIG. 9A, substrate 15 is typically black or dark coloured. Second colour layer 11 overlies and extends beyond white layer 12.

In FIG. 9B, 14 is a transparent substrate, each print portion comprising a white layer lying within a black layer. Second colour layer 11 overlies and extends beyond white layer 12 but lies within black layer 13.

Figure 9C:
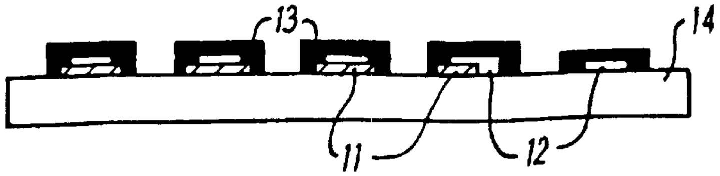

The order of printing the layers may be reversed. For example, in FIG. 9C, the second layer 11 is first printed onto substrate 14, then the white layer and then the black layer 13.

Figure 10A:
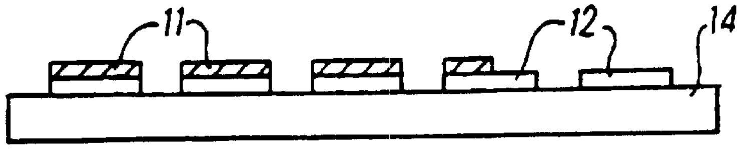
FIGS. 10A through to 10C are sections through a printed substrate illustrating Improved Exact Registration embodiments.

FIGS. 10A through to 10C illustrate the Improved Exact Registration embodiments of the invention.

In FIG. 10A, second colour layer 11 is exactly superimposed on white layer 12 within its outer boundaries.

Figure 10B:
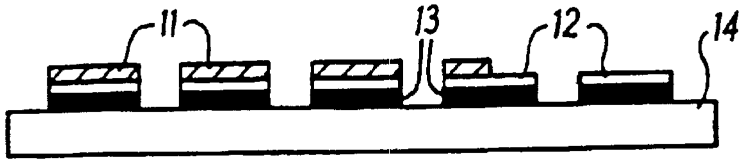

FIG. 10B is similar to FIG. 10A except that black layer 13 underlies white layer 12 with exact registration.

Figure 10C:
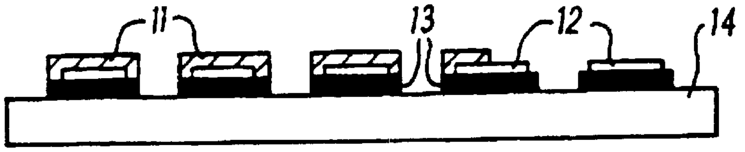

In FIG. 10C, white layer 12 lies within black layer 13 and is overlain by second colour layer 11 within the outer boundaries of second colour layer 11, layer 11 being in exact registration with black layer 12.

Figure 11:
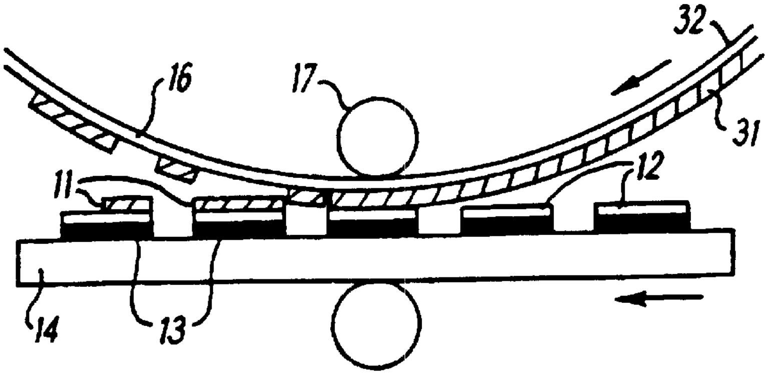
FIG. 11 is a section through illustrating the Thermal Transfer Differential Adhesion Method 1 and the Thermographic Differential Adhesion Method 2.

FIG. 11 illustrates the Thermal Transfer Differential Adhesion Method 1. A conventional thermal transfer resin ribbon 32 comprises a polyester support 16 and a pigmented resin layer 31. This is presented to a pre-printed substrate 21 which is partially printed, preferably by rotary screen printing of opaque pvc gloss ink to form a pre-printed pattern of a white layer 12 which may be underlain by a black layer 13 and may be overlain by a relatively highly plasticised pvc based clear ink or lacquer. A suitable lacquer is HG-70 manufactured by Wiederhold. The pre-printed substrate passes under a hot element imaging array 17 containing mini heat presses which are conventionally activated to melt and bond the pigmented resin layer 32 into the desired second design layer 11. The pigmented resin layer is only transferred to and bonded to the pre-printed portions and not to the intermediate areas of substrate 14.

FIG. 11 may also be considered to illustrate the Thermographic Differential Adhesion Method 2, except that 31 represents an electrographically printed conventional transfer medium, the support 16 typically being of paper and 13 representing the imaged transfer material which may incorporate a uv resistant wearcoat, all printed for example using the Scotchprint™ process, a trademark of the Minnesota Mining and Manufacturing Company. The pre-printed design 31 is transferred to the pre-printed substrate as previously described in Method 1 by a combination of heat and pressure of laminating rollers 17.

Figure 12A:
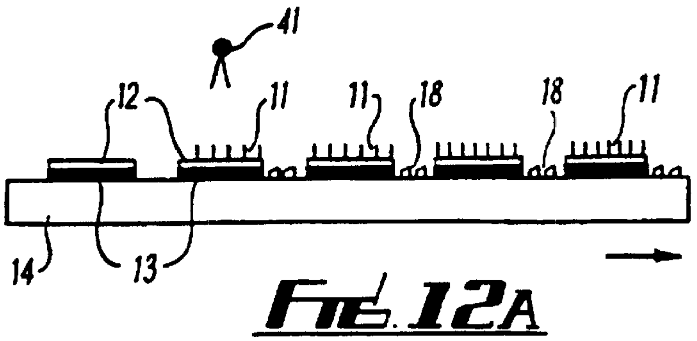
FIGS. 12 A and 12B are sections illustrating the Ink Jet Differential Adhesion Method 3.
Figure 12B:
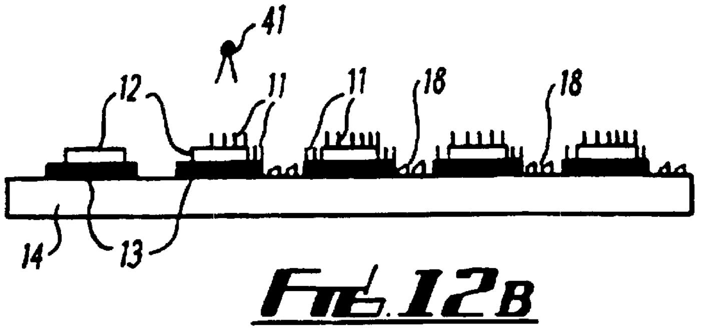

FIG. 12 illustrates the Ink Jet Differential Adhesion Method 3. A pre-printed substrate incorporate a hydrophilic ink layer 12, preferably a white ink which may be underlain by a black layer 13 which also may be hydrophilic ink. The black layer 13 may be in substantially exact registration with layer 12 as in FIG. 12A or may extend beyond the edges of layer 12, as in FIG. 12B. Ink jet or ink jet array 41 deposits water based transparent or translucent inks in a conventional manner as if to form a continuous image 11. However the ink is only adhered to and cured to the pre-printed ink 12 in the desired image. "Free" ink 18 applied between the pre-printed portions is rejected by the substrate and is either absorbed into black layer 13, where it becomes relatively invisible, or is removed in an immediate in line process, by such means of an air knife, a cleaning roller or other means.

Figure 13:
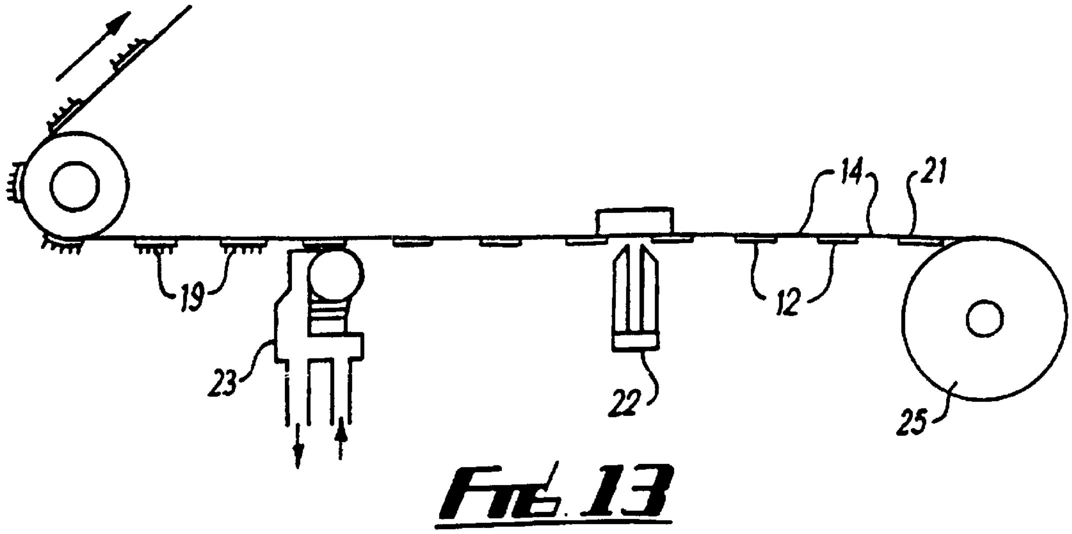
FIG. 13 is a section illustrating the Electrostatic Chargeable Print Pattern Method 4.

FIG. 13 illustrates the Electrostatic Chargeable Print Pattern Method 4. A part-processed substrate 21 comprises a substrate 14 and a pre-printed pattern 12 which comprises an electrostatically chargeable first layer, printed by any method, preferably comprising a white ink screen printed roll to roll by rotary screen printing. The pre-printed pattern may comprise more than one layer, for example a white layer on a black layer, with or without another electrostatically chargeable layer, and is preferably opaque.

The pre-printed substrate is fed from roll 25 through an electrostatic writing Stylus 22 which selectively charges only the pre-printed portions with the desired latent electrostatic image for the particular colour of toner in the toner fountain 23, which applies the required second layer image 19 to the pre-printed pattern only, leaving the intermediate areas of substrate 1 unprinted.

In all the above embodiments and methods, it is generally advantageous for one or more layers to be opaque, typically of opaque white and/or black, onto which transparent or translucent second layer inks can be applied, typically by a four colour digital printing system.

In all the above embodiments and methods, it is generally advantageous within all print portions within the outer boundaries of a second layer, for the ratio of the second layer width to the white layer width to have substantially the same value, in order to achieve consistent perceived colours.

It should also be understood that similar dimensional disciplines are appropriate for special inks or other imaging material such as luminescent, fluorescent, iridescent, phosphorescent, metallic or other eye attracting materials. The invention is also beneficial for the production of retro-reflective panels involving the partial deposition of retro-reflective materials and/or the partial printing of other inks, typically transparent or translucent inks, over retro-reflective materials.

Retro-reflective materials are commonly used in such fields as road signs, safety clothing, reflectors on bicycles and motor vehicles, advertisements and the like products, typically intended to be illuminated by the headlights of vehicles.

A retro-reflective material is one which causes an incident spectral ray of light to be reflected back substantially parallel to and substantially along the same path as the incident ray of light. Retro-reflective materials commonly incorporate an array of retro-reflective devices, such as "cube corners" or partially metallised glass or transparent plastic microspheres. One such device consists of faceted surfaces, typically three "silvered", reflective orthogonal surfaces meeting at a point which may be considered as the internal corner of a mirror surfaced cube, any incident ray of light being reflected from one surface to another, to emerge reflected back along a substantially similar path as the incident ray.

Another such device is a partially silvered or otherwise metallised transparent microsphere or "bead", arranged such that a ray of light, incident on an unmetallised part of the surface of any microsphere passes into the microsphere and is reflected back along a substantially similar path as the incident ray. Such microspheres are typically located within a clear or coloured transparent resin, which might form the matrix of an ink containing the microspheres.

In certain common applications, such as road traffic signs, the devices are contained within flexible or rigid substrates and are overpinted with ink. In certain cases the retro-reflective materials are overprinted with opaque ink over part of their area, for example in the form of indicia, thus forming a highly contrasting and visible sign when "caught" in the beam of a headlight.

Alternatively, transparent or translucent inks can be applied over the retro-reflective material and thus be illuminated by incident light which passes through the light permeable ink to the retro-reflective devices and returns through the coloured ink.

If retro-reflective microspheres are located within a coloured resin or other ink matrix, such inks are similarly retro-reflective.

The present invention enables particular improvements to be made to some of the above known products and methods incorporating retro-reflective materials. Ink containing retro-reflective microspheres is necessarily coarse in texture and achievable printing tolerances are typically worse than can be achieved with conventional inks. According to the present invention, retro-reflective ink can form the background layer 2 in FIGS. 2 to 7, to transparent or translucent design inks 3. Alternatively, retro-reflective ink may form the design colour layer 3, normally in lateral combination embodiments such as illustrated in FIGS. 3, 5 and 6.

The substrate may be flat, curved or moulded, to suit particular embodiments of the invention.

The invention is not restricted to the specific embodiments described above and many variations and modifications can be made.

What is claimed is:

1. A method of printing a panel comprising:

providing a sheet of transparent material;

printing select areas of said transparent material with a print pattern;

scanning said sheet of transparent material and said printed select areas thereon so as to identify leading edges and trailing edges of said printed select areas; and instructing a digital printing machine to print a superimposed layer on select portions of said printed select areas, and wherein said instructing is based on said identified leading edges and trailing edges of said printed select areas.

2. A method as claimed in claim 1, wherein said digital printing machine uses a Raster Image Processor for enabling the positioning and size of deposits of black, cyan, magenta and yellow marking material in a four color process to form said superimposed layer.

3. A method as claimed in claim 2, further comprising instructing said digital printing machine so that it does not print on any unprinted areas of said transparent material.

4. A method as claimed in claim 1, wherein said print pattern comprises a plurality of lines.

5. A method as claimed in claim 1, wherein said print pattern is opaque.

6. A method as claimed in claim 4, wherein said transparent material is fed for printing by said digital printing machine in a direction perpendicular to said lines.

7. A method as claimed in claim 1, wherein said print pattern comprises a layer of white material and a layer of black material.

8. A method as clamed in claim 7, wherein a layer of clear material is applied to said white material, said clear material being receptive to a marking material.

9. A method as claimed in claim 1, wherein said digital printing machine is a thermal transfer digital printing machine.

10. A method as claimed in claim 1, wherein said digital printing machine is an ink jet digital printing machine.

11. A method as claimed in claim 1, wherein said print pattern comprises a plurality of layers.

* * * * *